Oct. 8, 1935. L. R. MYERS ET AL 2,016,574
BRAKE TOOL
Filed Jan. 4, 1935 3 Sheets-Sheet 2
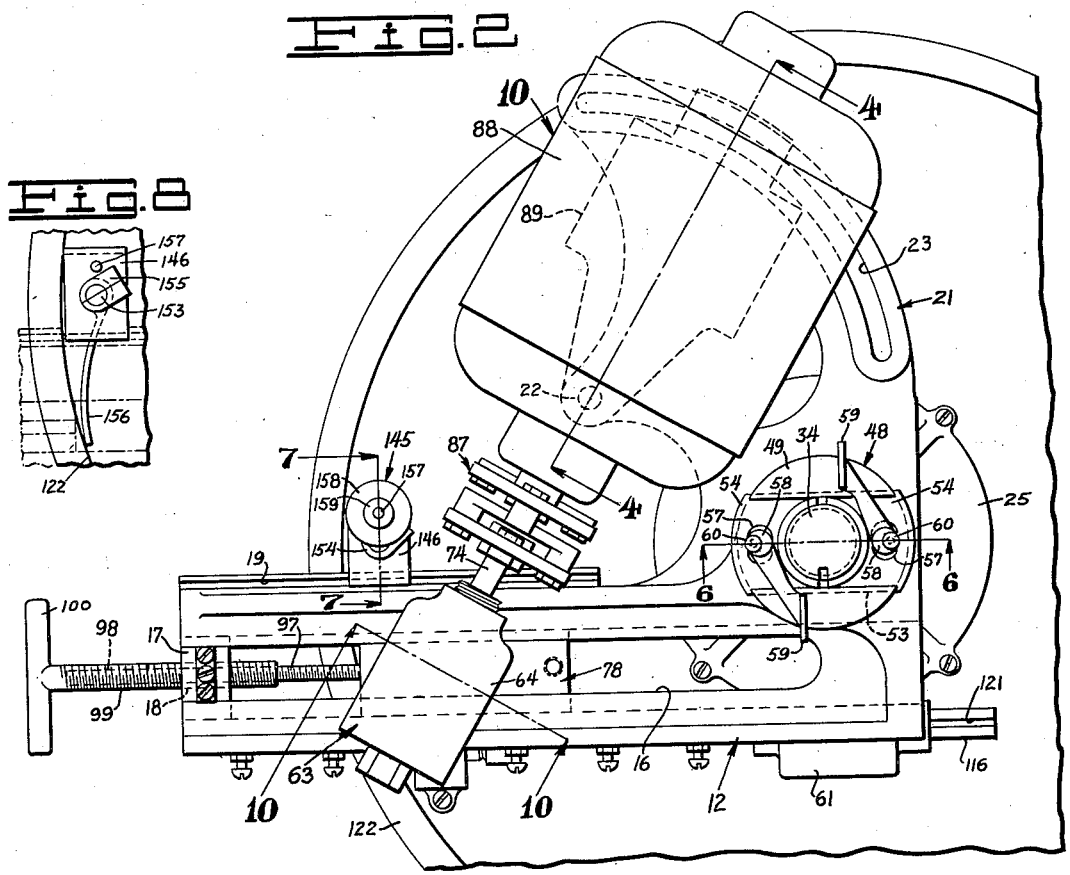
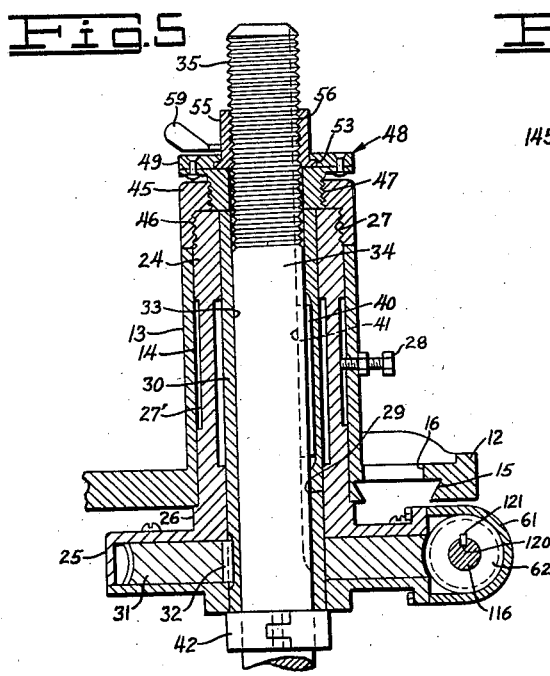
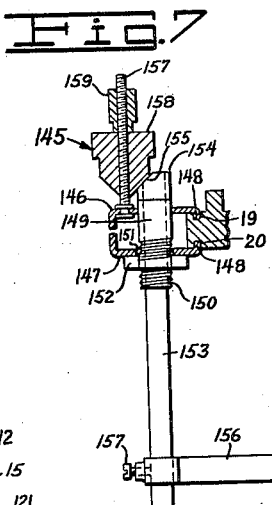
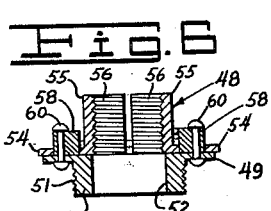
INVENTORS.
LESLIE R. MYERS.
OSCAR MAYER.
BY
ATTORNEY.

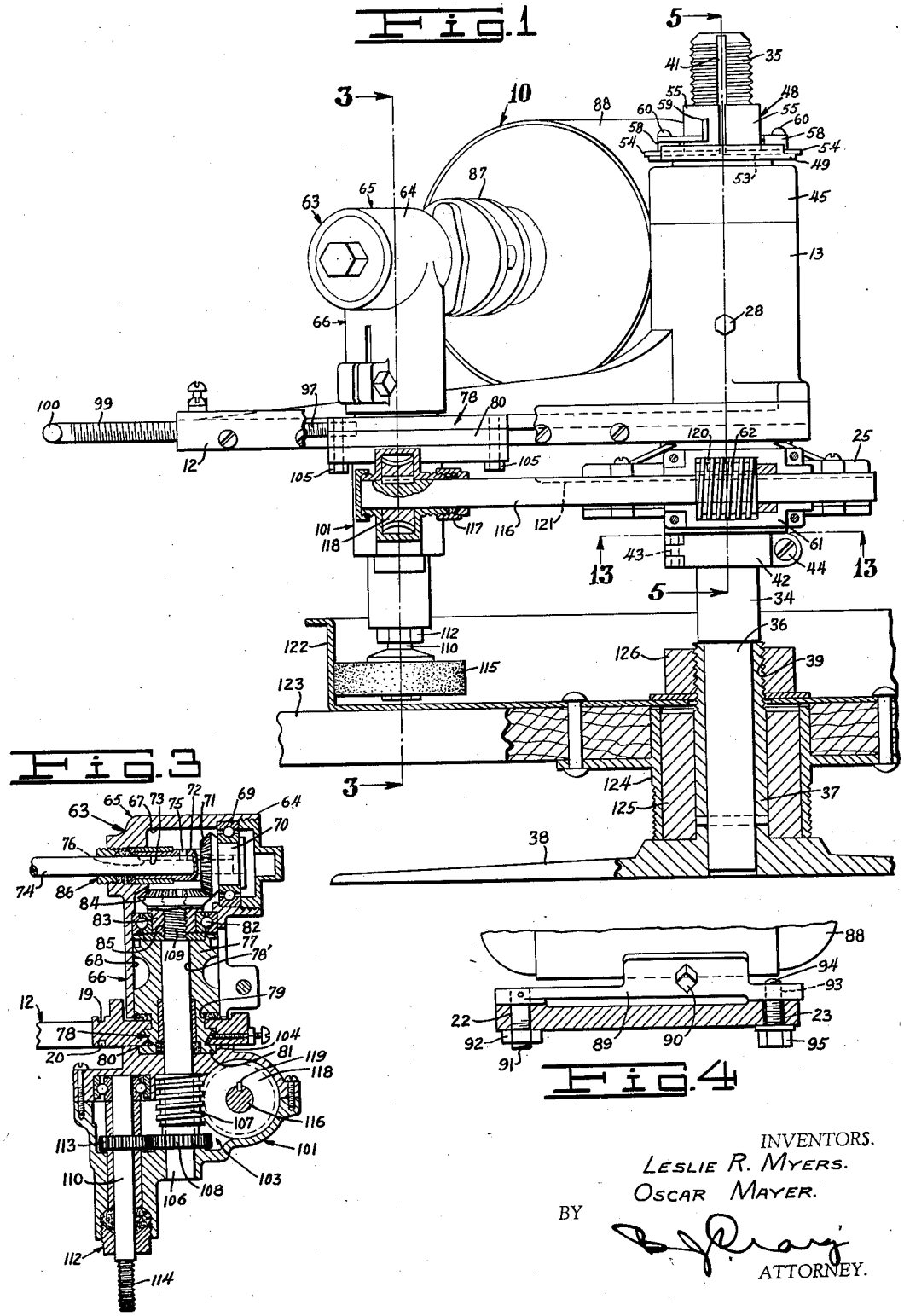

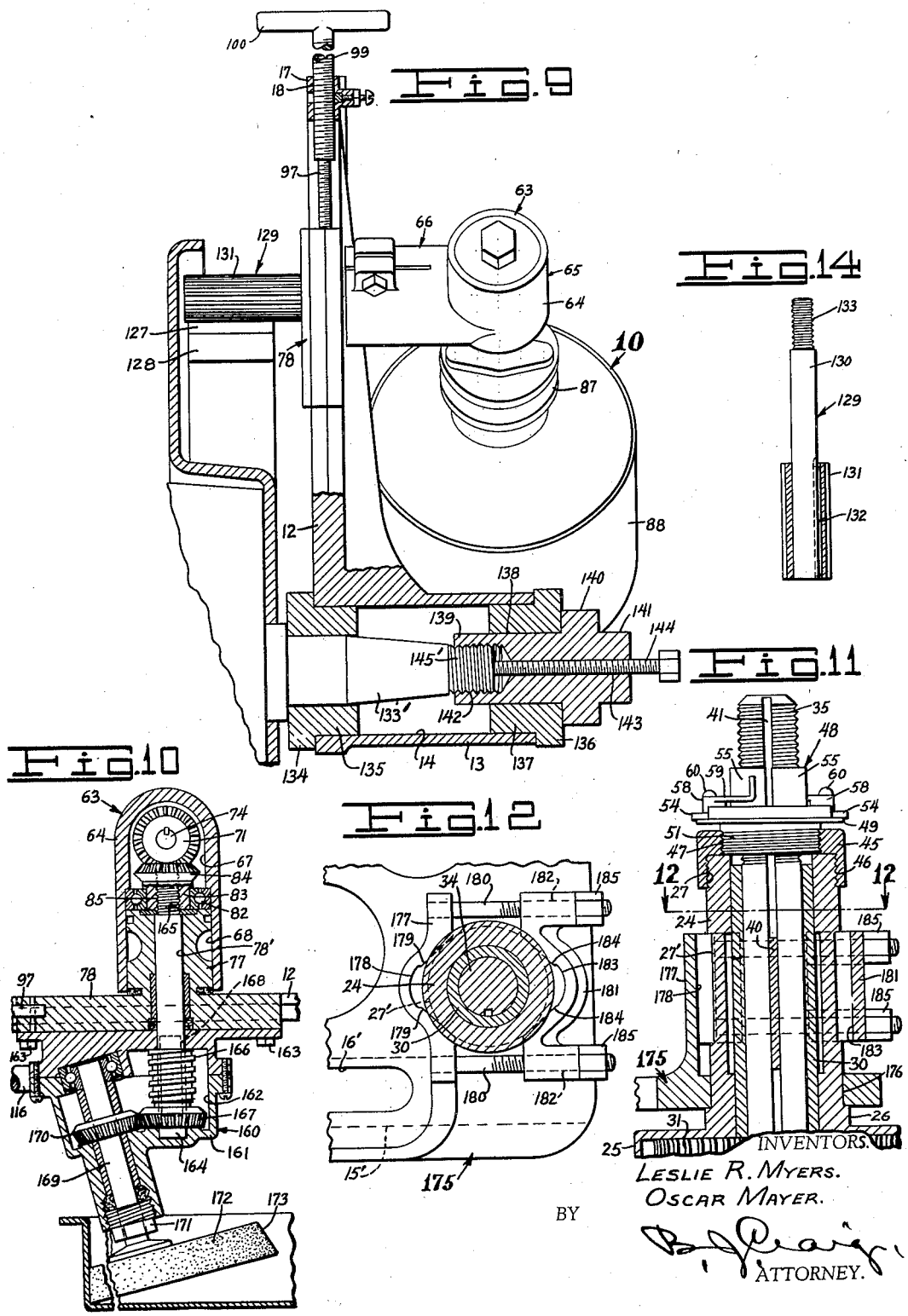

Patented Oct. 8, 1935

2,016,574

UNITED STATES PATENT OFFICE 2,016,574

BRAKE TOOL

Leslie R. Myers, Eagle Rock, and Oscar Mayer, Whittier, Calif., assignors to Roy A. Barr, Whittier, Calif.

Application January 4, 1935, Serial No. 400

14 Claims. (Cl. 51—43)

This invention relates to improvements in brake tools.

The general object of our invention is to provide an improved tool which is adapted for use in grinding or truing brake drums and brake linings on the shoes.

Another object of the invention is to provide novel means for mounting a brake tool for operation on a brake drum.

A further object of the invention is to provide a novel brake tool which is adapted to operate on brake linings without removing the brake linings from their mountings.

An additional object of the invention is to provide a novel means for mounting a tool carriage on a brake tool.

Another object of the invention is to provide a novel means for causing the cutter of a brake tool to move progressively around the brake.

A further object is to provide a novel means for controlling the movement of a brake cutting tool transversely of the brake.

A still further object of the invention is to provide a novel gauge for a brake tool.

Other objects and the advantages of this invention will be apparent from the following description taken in connection with the accompanying drawings wherein:

Fig. 1 is a side elevation of our improved brake tool showing it partly in section and operatively mounted to work upon a brake drum;

Fig. 2 is a top plan view of the tool shown in Fig. 1;

Fig. 3 is a section taken on line 3—3 of Fig. 1;

Fig. 4 is a fragmentary section taken on line 4—4 of Fig. 2;

Fig. 5 is a fragmentary section taken on line 5—5 of Fig. 1;

Fig. 6 is a section through the feed cap taken on line 6—6 of Fig. 2;

Fig. 7 is a section through the gauge taken on line 7—7 of Fig. 2;

Fig. 8 is a top plan view of Fig. 7;

Fig. 9 is a view of the tool similar to Fig. 1 showing it operatively mounted to work on a brake band;

Fig. 10 is a fragmentary section taken on line 10—10 of Fig. 2 showing a modified form of grinder operating means;

Fig. 11 is a view similar to Fig. 5 showing a modified form of base and supporting means;

Fig. 12 is a section taken on line 12—12 of Fig. 11;

Fig. 13 is a section taken on line 13—13 of Fig. 1; and,

Fig. 14 is a detail view of the cutting tool assembly.

Referring to the drawings by reference characters we have indicated our brake tool generally at 10. This brake tool 10 is an improvement over our brake tool shown and described by us in our prior patent, Number 1,927,898, issued Sept. 26, 1933. As shown the brake tool 10 comprises a base 12 having an integral upwardly extending boss 13 thereon at one end. This boss 13 has an aperture 14 therethrough. In the under face of the base 12 we provide a dovetailed groove 15 and communicating with the groove 15 and opening through the upper face of the base we provide an elongated aperture 16 (see Figs. 2 and 5).

The longitudinal center of the groove 15 and the aperture 16 is offset at one side of the vertical center of the boss 13. Adjacent the end of the base 12 opposite the boss 13 we provide a block portion 17 which extends across the groove 15 and the aperture 16 and which includes a threaded aperture 18 (see Figs. 2 and 9). Adjacent one side of the base 12 we provide in the upper and lower faces thereof grooves 19 and 20, respectively, (see Figs. 2 and 3). At the side of the boss 13 opposite the groove 15 and the aperture 16 the base 12 includes a motor supporting portion 21 which has a pivot aperture 22 and an elongated arcuate slot 23 therein (see Figs. 2 and 4). The axis of the arcuate slot 23 is co-incident with the axis of the pivot aperture 22.

Positioned in the aperture 14 of the boss 13 we provide a hub 24 which is integral with a gear housing 25 which is positioned below the base 12. Adjacent the gear housing the hub 24 includes an enlarged portion 26 on which the base 12 rests and at the opposite end the hub includes a threaded portion 27 which projects above the boss 13. Intermediate the portion 26 and the threads 27 the hub 24 includes a reduced portion 27'. The boss 13 and the hub 24 are connected for simultaneous movement by a set screw 28.

The hub 24 and the gear housing 25 have an aperture 29 therethrough in which a sleeve 30 is positioned. Positioned in the housing 25 we provide a worm gear 31 which surrounds the sleeve 30 and secured thereto by a key 32. The sleeve 30 has an aperture 33 therethrough in which a shaft 34 is positioned. Adjacent its upper end the shaft 34 includes a threaded portion 35 and adjacent the opposite end the shaft includes a reduced portion 36 which is positioned in and secured to a hub member 37 or a supporting base 38 (see Fig. 1). Adjacent its upper end the hub member 37 includes a threaded portion as indicated at 39. The sleeve 30 and the shaft 34 are connected by a key 40 in the sleeve which operates in a slot 41 in the shaft 34.

To limit the downward movement of the device on the shaft 34 we provide a removable clamp collar 42 which surrounds the shaft. The collar 42 is made in two sections which at one point are hingedly connected as at 43 and opposite the hinge are removably connected by a bolt 44 (see Fig. 13).

Positioned on the upper end of the hub 24 we provide a top member 45 which includes a threaded recess 46 the threads of which engage the threaded portion 27 of the hub. The top member 45 further includes a threaded aperture 47 which is adjacent to the threaded recess 46.

Mounted on the top member 45 we provide a feed cap 48. As shown the feed cap 48 includes a flat portion 49 having a depending boss 50 which is externally threaded as at 51 and includes aperture 52 therethrough (see Fig. 6). In the flat portion we provide an undercut groove 53 in which a pair of opposed similar plates 54 are positioned. Each of the plates 54 include a semi-cylindrical upstanding hub portion 55 which is internally threaded as at 56. Each of the plates 54 has an elongated aperture 57 therein in which a cylindrical cam member 58 is positioned. Each of the cam members 58 includes an operating arm 59 and are each pivoted as at 60, to their respective plate members. The axes of the pivots 60 are positioned at one side of the axes of the cam members 58 so that when the operating arms 59 are swung towards the shaft 35 the plates 54 move towards the shaft and the threads 56 of the hubs 55 engage the threads 35 on the shaft and when the operating arms 59 are swung away from the shaft 35 the plates 54 move away from the shaft thereby moving the threads 56 of the hubs 55 out of engagement with the threads of the shaft.

Mounted on the gear housing 25 we provide another gear housing 61 in which a worm pinion 62 is positioned which meshes with the worm gear 31. On the base 12 we provide a drive mechanism which is indicated generally at 63 and shown in detail in Fig. 3. As shown the drive mechanism 63 includes a housing 64 which comprises a horizontal portion 65 and a vertical portion 66. The horizontal portion 65 of the housing 64 has a chamber 67 therein and the vertical portion 66 has a chamber 68 therein which communicates with the chamber 67. In the chamber 67 we provide an anti-friction bearing 69 in which a hub portion 70 of a bevel gear 71 is mounted. Opposite the hub portion 70 the gear 71 includes another hub portion 72. The gear and hub portions thereof have an aperture 73 therethrough in which a shaft 74 is positioned. The hub portion 72 of the gear is connected to the shaft 74 by a spline 75 which operates in an elongated slot 76 in the shaft 74.

Positioned in the chamber 68 of the vertical portion 66 of the housing 64 we provide a spindle portion 77 which is integral with a base portion 78 which may be termed a tool carriage. The spindle 77 and the base portion 78 have an aperture 78' therethrough. The base portion 78 includes a reduced portion 79 which is positioned in the aperture 16 of the base 12, a dove-tailed portion 80 which is positioned in the dove-tailed groove 15 of the base 12 and an enlarged flat portion 81 which engages the under surface of the base 12 (see Fig. 3). Positioned in the chamber 68 above the spindle 77 we provide an anti-friction bearing 82 in which the hub 83 of a bevel gear 84 is mounted. The bevel gear 84 and hub 83 meshes with the bevel gear 71.

The shaft 74 extends out of the housing 64 through a packing gland 86 and is suitably secured to one portion of a flexible coupling which is indicated generally at 87. The associated portion of the flexible coupling is connected to the armature shaft of an electric motor 88. As shown in Figures 2 and 4 the motor is mounted on a cradle 89 and secured thereto by bolts 90. The cradle 89 has a threaded pivot pin 91 thereon which is positioned in the aperture 22 of the base 12 and on which nut 92 is provided for rigidly clamping the cradle to the base.

At the end of the cradle opposite the pivot 91 the cradle includes a threaded aperture 93 to receive a bolt 94 which is positioned in the arcuate slot 23 with the head 95 of the bolt engaging the underside of the base.

When the motor 88 operates it rotates the shaft 74 through the medium of the flexible coupling 87 and the shaft 74 rotates the bevel gear 71 which in turn rotates the bevel gear 84.

For moving the drive mechanism to adjusted positions along the base 12 we provide a threaded stem 97 on the base 78 which is positioned in a threaded recess 98 of a threaded stem 99 which is positioned in the threaded aperture 18 of the block 17 and includes an operating handle 100.

When the motor pivot nut 92 and the clamp bolt 95 are loosened, upon rotation of the stem 99 the stem 97 will move the driving mechanism 63 to any desired position along the aperture 16.

Mounted on the base or tool carriage 78 of the drive mechanism 63 we provide a tool and rotating drive mechanism which is indicated generally at 101. As shown the drive mechanism 101 includes a housing 102 having a chamber 103 therein and in its upper face the housing has a recess 104 therein in which the flat portion 81 of the base 78 of the drive mechanism 63 is positioned. The housing 101 is removably secured to the tool carriage 78 of the drive mechanism by a plurality of bolts 105 (see Fig. 1).

Rotatably mounted in the housing 101 we provide a vertical shaft 106 which within the chamber 103 has a worm pinion 107 and a spur gear 108 secured thereto. Adjacent the upper end of the shaft 106 we provide a reduced threaded portion 109. The shaft 106 is positioned in the aperture 78' of the spindle 77 and the threaded portion 109 of the shaft engages the threads of the bevel gear 84. Rotatably mounted in the housing 101 at one side of the shaft 106 we provide a vertical tool shaft 110 which passes out of the housing through a packing gland 112. In the chamber 103 the shaft 110 has a spur gear 113 secured thereto which meshes with the spur gear 108. Adjacent its lower end the shaft 110 includes a threaded portion 114 for securing an abrasive wheel 115 thereto in the usual manner.

From the foregoing it will be apparent that when the bevel gear 84 is rotated as previously described it will rotate the shaft 106 which through the medium of the gears 108 and 113 will rotate the tool shaft 110 which in turn will rotate the abrasive wheel 115.

Rotatably mounted in the housing 101 at the side of the shaft 106 opposite the shaft 110 and at right angles thereto we provide a shaft 116 which extends out of the housing 101 towards the housing 25 through a packing gland 117. In the chamber 103 a worm gear 118 is mounted on the shaft 116 and secured thereto by a key 119. The worm gear 118 meshes with the worm pinion 107.

The shaft 116 is rotatably and slidably mounted in the housing 61 and the gear 62 therein is slidably mounted on the shaft 116 and is rotatably connected thereto by a spline 120 which operates in an elongated groove 121 in the shaft 116. Thus it will be apparent that when the shaft 106 is rotated as previously described it will through the medium of the worm pinion 107 and worm gear 118 rotate the shaft 116 which in turn will rotate the worm pinion 62. As the worm gear 31 is retained stationary with the shaft 34 rotation of the worm pinion 62 will cause the worm pinion 62 to walk around the worm gear 31 thereby causing the base 12 and parts mounted thereon to travel around the axis of the shaft 34. As the base 12 rotates around the axis of the shaft 34 the threads 56 of the feed cap 48 in conjunction with the threaded portion 35 of the shaft elevates the base 12 and its associated parts.

To lower the base 12 and its associated parts after it has been elevated the operating handles are swung away from the shaft 34 to cause the threads 56 of the feed cap 48 to disengage the threaded portion 35 of the shaft as previously described whereupon the base 12 and its associated parts may be lowered.

In Fig. 1 we have shown the device 10 as operating to true up the inside of a brake drum 122 which is secured to a wheel 123. The wheel 123 is positioned on the supporting base 38 with the hub 124 thereof surrounding the hub member 37. A removable bushing 125 is positioned on the hub 37 to compensate for the difference between the outer diameter of the hub 37 and the inner diameter of the wheel hub 124. A nut 126 is positioned on the threaded portion 39 of the hub 37 to firmly clamp threaded portion 39 of the hub 37 to firmly clamp the wheel 123 to the supporting base. Thereafter the device 10 is operatively mounted on the shaft 34 as previously described with the abrasive wheel 115 as far in the brake drum as possible.

The operator then moves the abrasive wheel into engagement with the side wall of the brake drum by rotating stem 99 as previously described and then starts the motor 88. As the motor operates the abrasive wheel is rotated in the manner previously described and at the same time the base 12 and its associated parts rotate about the axis of the shaft 34 and move upward as previously described thereby correctly shaping the operating face of the brake drum 122 to a correct arc about the axis of the wheel 123.

In Fig. 9 we have shown the device 10 as operating to true up the outer face of the lining 127 of an internal expanding brake 128. To perform this operation the wheel associated with the brake to be worked on is removed and with the device 10 the feed cap 48 and the cover member 45 are removed from the hub 24. Furthermore the bolts 105 are backed out to disengage the housing 101 from the tool carriage 78 of the drive mechanism and then by rotating the tool shaft 110 in the reverse direction from which it is driven the threaded portion 109 of the shaft 106 is disengaged from the threaded aperture 85 of the bevel gear 84. As the shaft 106 is being disengaged from the bevel gear 84 the base 12 is raised upwardly and removed from the hub 24.

In Fig. 14 we have indicated at 129 one form of cutting tool assembly for truing brake bands. As shown the tool 129 comprises a shaft 130 having a suitable cutting tool 131 mounted thereon adjacent one end which is secured to the shaft for rotation therewith by a key 132. At the end of the shaft opposite the cutting tool a reduced threaded portion 133 is provided. To operatively connect the cutting tool assembly to the device 10 the shaft 130 is positioned in the aperture 78' of the spindle 77 of the drive mechanism 63 with the threads 133 engaging the threads 85 of the bevel gear 84. Thus when the bevel gear 84 is rotated as previously described the shaft 130 and the cutting tool 131 will be rotated.

Thereafter the device 10 is positioned on the wheel axle 133'. In Fig. 9 we have shown one of many means for mounting the device 10 on the axle 133'. As shown a bushing 134 having a reduced portion 135 is positioned on the axle 133' and then the base 12 is positioned on the bushing 134 with the reduced portion 135 of the bushing positioned in the aperture 14 of the boss 13. Another bushing 136 having a reduced portion 137 is positioned on the boss 13 at the end thereof opposite the bushing 134 with the reduced portion 137 thereof positioned in the boss aperture 14. The bushing 136 has an aperture 138 therein in which a plug member 139 is positioned. The plug member 139 includes an enlarged head 140 and a reduced wrench engaging portion 141. The plug 139 further includes a threaded recess 142 and a communicating reduced threaded aperture 143 in which a bolt 144 is positioned. The threads 142 of the plug member 139 engage the threaded portion 145' of the axle 133' and firmly clamp the bushing 136 against the end of the boss 13. The bolt 144 is adapted to be moved into firm engagement with the end of the axle 133' to lock the plug member 139 against accidental rotation.

Thereafter the cutting tool 131 is moved into engagement with the brake lining 127 by moving the drive mechanism 63 by means of the stem 99, as previously described.

After starting the motor 88 the operator manually rotates the device 10 about the axis of the axle 133' thereby correctly shaping the brake lining 127 to a correct arc about the axis of its associated wheel.

When a brake drum and its associated brake lining are both to be trued up a diameter gauge such as indicated at 145 and shown in detail in Figs. 7 and 8 may be used. As shown the gauge 145 includes a pair of opposed plates, a top plate 146 and a bottom plate 147 each having at one end thereof flange portions 148 bent towards each other. The top plate 146 has a hollow sleeve 149 secured thereto, the lower end of which is externally threaded as at 150. The lower plate 147 has an aperture 151 therein through which the sleeve 149 extends and adjacent the underside of the lower plate a nut 152 is provided on the threaded portion 150 of the sleeve.

Positioned in the sleeve 149 we provide a shaft 153 having a cam arm 154 secured thereto above the top plate 146. The cam arm 154 has an inclined cam face 155 on one side thereof. Adjacent the lower end of the shaft 153 we provide a gauge finger 156 which is secured to the shaft by a set screw 157.

Mounted on the top plate 146 at one side of the shaft we provide a threaded stem 157 on which a nut 158 and a lock nut 159 are positioned. The nut 158 has a conical lower face 160 which is adapted to engage the inclined face 155 of the cam arm 154. When the nut 158 is moved upward the cam arm 154 can swing closer to the stem 157 and when the nut 158 is moved downward the conical face thereof engages the inclined face of the cam arm and swings the cam arm outward which in turn rotates the shaft 153 and swings the gauge arm 156.

In operation the flange portions 148 of the plates 146 and 147 are positioned in the grooves 19 and 20 of the base 12 and then the nut 152 is screwed up tight against the plate 147 to securely clamp the device 145 to the base 12. After the brake drum has been ground sufficiently the nut 158 is moved downward until the gauge finger 156 engages the inner face of the brake drum as shown in Fig. 8, then the lock nut 159 is screwed down into tight engagement with the nut 158 to retain it locked in the position to which it has been moved. Thereafter when the cutting tool 131 is put on and the device 10 is positioned on the axle 133' to trim the brake lining the side of the cutting tool 131 is set against the outer face of the end of the gauge arm 156 and then the gauge arm is swung out of the way. Then when the device operates the cutting tool will trim the brake lining to the same diameter as the working face of the brake drum.

In Fig. 10 we have indicated a slightly modified form of tool driving mechanism generally at 160 which is adapted to replace the tool drive mechanism. As shown the device 160 includes a housing 161 having a chamber 162 therein. The housing 161 is secured to the tool carriage 78 of the drive mechanism 63 by bolts 163 in the same manner as previously described in connection with the tool drive mechanism 101. Rotatably mounted in the housing 161 we provide a vertical shaft 164 which like the shaft 106 is positioned in the aperture 78' of the spindle 77 and includes a reduced threaded portion 165 which engages the threads 85 of the bevel gear 84. Positioned in the chamber 162 and secured to the shaft 164 we provide a worm pinion 166 and a miter gear 167. Positioned in the chamber 162 we provide a worm gear 168 which is similar to the worm pinion 113 and is connected to the shaft 116 in the same manner as that previously described in connection with the worm gear.

Rotatably mounted in the housing 161 at one side of the shaft 164 we provide an inclined shaft 169 the axis of which is in line with the longitudinal center of the aperture 16 in the base 12. Mounted on the shaft 169 in the chamber 162 we provide a miter gear 170 which meshes with the miter gear 167. The shaft 169 extends out of the housing 161 through a packing gland 171 and has suitable means thereon like the shaft 110 for securing an abrasive wheel 172 thereto. The peripheral face of the abrasive wheel 172 instead of being at right angles to the faces thereof is inclined as indicated at 173.

In Figs. 11 and 12 we have indicated a modified form of the base 12 generally at 175 which includes a different means for mounting it on the hub 24. The base 175 is similar in all respects to the base 12 with the exception that the boss 13 is omitted and like portions thereof are indicated by similarly primed reference numerals. Adjacent the end of the base 175 where the boss is positioned on the base 12 the base 175 has an aperture 176 therein. Adjacent the side of the aperture 176 towards the driving mechanism the base 175 includes an integral upstanding flange 177, the face of which towards the aperture 176 includes a recess 178 having opposed angular faces 179. On each side of the aperture 176 we provide on the flange 177 a pair of threaded studs 180 which extend towards the opposite side of the aperture.

Mounted on the studs 180 we provide a clamp member 181 which includes a plurality of apertures 182 in which the studs 180 are positioned. The clamp member 181 like the flange 177 includes a recess 183 having opposed angular faces 184.

When the base 175 is mounted on the hub 24 the angular faces 179 of the flange 177 and the angular faces 184 of the clamp member 181 engage the surface of the reduced portion 27' of the hub 24 and nuts 185 are positioned on the studs 180 to firmly clamp the member 181 and flange 177 to the hub 24.

From the foregoing description it will be apparent that we have provided a novel brake tool which is simple in construction, accurate and efficient in use.

Having thus described our invention, we claim:

1. In a tool device, a base, means to rotatably support said base, a tool carriage movable on said base, a spindle on said carriage, said spindle having a bore therein, a shaft rotatably positioned in said bore, a drive shaft, means to support said drive shaft, a gear on said first shaft, a gear on said drive shaft and meshing with said first gear and means whereby said base is rotated about the axis of said base supporting means when the tool carriage shaft rotates.

2. In a tool device, a base, means to rotatably support said base, said base having an aperture therein, a tool carriage, said carriage including a part in said aperture and movable along said base, a spindle on said carriage, said spindle having a bore therein, a shaft rotatably positioned in said bore, a drive shaft, means to support said drive shaft, a gear on said first shaft, a gear on said drive shaft meshing with said first gear, said second gear being axially movable relative to said drive shaft, means connecting said second gear and said drive shaft for simultaneous rotation, and means whereby said base is rotated about the axis of said base supporting means when the tool carriage shaft rotates.

3. In a tool device, a base, means to rotatably support said base, said base having an aperture therein, a tool carriage, said carriage being movable on said base, a spindle on said carriage, said spindle having a bore therein, a shaft rotatably positioned in said bore, a drive shaft, means to support said drive shaft, a gear on said first shaft, a gear on said drive shaft meshing with said first gear, said second gear being axially movable on said drive shaft, means connecting said second gear and said drive shaft for rotation together, means whereby said base is rotated about the axis of said base supporting means when the tool carriage shaft rotates, and means whereby when said base rotates about the axis of said base supporting means said base is moved axially along said base supporting means.

4. In a tool device, a base having an elongated aperture, a tool carriage, a portion of said tool carriage being positioned in said aperture, a shaft rotatably mounted in said tool carriage, means to rotate said shaft, a second shaft rotatably mounted in said tool carriage, said second shaft being positioned at an angle to said first shaft, a gear on said first shaft, a gear on said second shaft meshing with said gear on said first shaft and an abrasive wheel on said second shaft, said abrasive wheel having its peripheral cutting face arranged at an angle other than right angles to its opposed faces.

5. In a tool device, a base having a tool holder thereon and having an aperture therein, an upstanding flange on said base adjacent said aperture, a supporting device, a hub rotatably mounted on said supporting device, said hub being positioned in said base aperture, means to removably clamp said base flange to said hub, said supporting device including a threaded portion and means on said hub to engage said threaded portion of said supporting device, said means being movable into and out of engagement with said threaded portion of said supporting device.

6. In a tool device, a base having an apertured boss thereon, a tool carriage on said base, a spindle member having a threaded portion adjacent one end, a bushing, said bushing including a portion positioned in said boss aperture, said bushing having an aperture, said spindle being positioned in said bushing aperture, a second bushing, said second bushing having a portion positioned in said boss aperture at the end thereof opposite said first bushing, said second bushing having an aperture and a plug member positioned in said aperture of said second bushing, said plug member including a threaded recess, a threaded aperture in said plug member coaxial with said threaded recess, said threaded portion of said spindle being positioned in said threaded recess of said plug.

7. In a tool device, a base, said base having an upstanding boss thereon and having an elongated aperture therein, said boss having an aperture therein, a tool carriage, a portion of said tool carriage being positioned in said base aperture, a shaft rotatably mounted in said tool carriage, a drive shaft, means to support said drive shaft, a gear on said tool carriage shaft, a gear on said drive shaft meshing with said first gear, said second gear being axially movable on said drive shaft and means connecting said second gear and said drive shaft for rotation together, a member positioned in said aperture of said boss, a supporting device, said member being rotatably mounted on said supporting device, means connecting said member and said boss against relative rotation, said supporting device including a threaded portion, a pair of semi-cylindrical internally threaded hubs slidably mounted on said member for engaging said threaded portion of said pivotally mounted supporting device, said threaded hubs being movable into and out of engagement with said threaded portion of said supporting device.

8. In a tool device, a base, said base having an upstanding boss thereon and having an elongated aperture therein, said boss having an aperture therein, a tool carriage on said base, a shaft rotatably mounted in said tool carriage, a drive shaft, means to support said drive shaft, a gear on said tool carriage shaft, a gear on said drive shaft meshing with said first gear, said second gear being axially movable on said drive shaft and means connecting said second gear and said drive shaft for rotation together, a member positioned in said aperture of said boss, a supporting device, said member being rotatably mounted on said supporting device, means connecting said member and said boss, said supporting device including a threaded portion, threaded means on said member for engaging said threaded portion of said supporting device, said threaded means being movable into and out of engagement with said threaded portion of said supporting device, means whereby said base is rotated about the axis of said supporting device when said tool carriage shaft rotates and means whereby when said threaded means engages said threaded portion of said supporting device said base is moved axially along said supporting device.

9. In a tool device, a base, said base having an upstanding apertured boss thereon, said base having an elongated aperture, a tool carriage on said base, a tool shaft rotatably mounted in said tool carriage, means to rotate said shaft, a hub, said hub being positioned in said boss aperture, a gear housing on said hub, a supporting device, said hub and said housing being rotatably mounted on said supporting device, means connecting said hub and said boss, a worm gear in said housing and surrounding said supporting device, means connecting said worm gear and said supporting device, a feed shaft, a worm pinion on said feed shaft, said feed shaft being movable axially relative to said worm pinion for rotation therewith, a worm pinion on said first tool carriage shaft, a worm gear on and secured to said feed shaft meshing with said worm pinion on said first tool carriage shaft, said supporting device including a threaded portion, threaded means on said hub for engaging said threaded portion of said supporting device, said threaded means being movable into and out of engagement with said threaded portion of said supporting device.

10. In a tool device, a base having an elongated aperture and having an apertured boss thereon, a tool carriage, a portion of said tool carriage being positioned in said elongated aperture, a bushing, said bushing including a reduced portion positioned in one end of said boss aperture, said bushing having an aperture adapted to receive a spindle, a second bushing, said second bushing having a reduced portion positioned in said boss aperture at the end thereof opposite said first bushing, said second bushing having an aperture, a plug member positioned in said aperture of said second bushing, said plug member including an enlarged head and a wrench engaging portion, a threaded recess in said plug member adapted to receive a threaded portion of a spindle, a threaded aperture in said plug member coaxial with said threaded recess, and a bolt in said threaded aperture of said plug adapted to engage the end of a spindle.

11. In a tool device, a base, said base having an upstanding boss thereon and having an elongated aperture therein, said boss having an aperture, a tool carriage, a portion of said tool carriage being positioned in said base aperture, a shaft rotatably mounted in said tool carriage, means to rotate said shaft, a second shaft rotatably mounted in said tool carriage, means to drive said first shaft, from said second shaft, a hub, said hub being positioned in said boss aperture, a gear housing on said hub, a supporting device, said hub and said housing being rotatably mounted on said supporting device, means connecting said hub and said boss for rotation together, a worm gear in said housing, means connecting said worm gear and said supporting device for rotation together, a feed shaft, a worm pinion on said feed shaft, said feed shaft being movable axially relative to said worm pinion and means connecting said feed shaft and said worm pinion for rotation together, a worm pinion on said first tool carriage shaft and a worm gear on and secured to said feed shaft meshing with said worm pinion on said tool carriage shaft.

12. In a tool device, a base, said base having an upstanding boss thereon and having an elongated aperture therein, said boss having an aperture, a tool carriage, a portion of said tool carriage being positioned in said base aperture, a shaft rotatably mounted in said tool carriage, means to rotate said shaft, a second shaft rotatably mounted in said tool carriage, a gear mounted on and secured to said first shaft, a gear mounted on and secured to said second shaft, said second gear meshing with said first gear, means to secure a tool on said second shaft, a hub, said hub being positioned in said boss aperture, a gear housing integral with said hub, a supporting device, said hub and said housing being rotatably mounted on said supporting device, means connecting said hub and said boss for rotation together, a worm gear in said housing, means connecting said worm gear and said supporting device for rotation together, a feed shaft positioned at right angles to said supporting device and said first tool carriage shaft, a worm pinion on said feed shaft, said feed shaft being movable axially relative to said worm pinion and means connecting said feed shaft and said worm pinion for rotation together, a worm pinion on said first tool carriage shaft and a worm gear on and secured to said feed shaft meshing with said worm pinion on said tool carriage shaft.

13. In a tool device, a base, said base having an upstanding apertured boss thereon, said base having an elongated aperture, a tool carriage, a portion of said tool carriage being positioned in said base aperture, a shaft rotatably mounted in said tool carriage, means to rotate said shaft, a second shaft rotatably mounted in said tool carriage, a gear mounted on and secured to said first shaft, a gear mounted on and secured to said second shaft, said second gear meshing with said first gear, means to secure a tool on said second shaft, a hub, said hub being positioned in said boss aperture, a gear housing on said hub, a supporting device, said hub and said housing being rotatably mounted on said supporting device, means connecting said hub and said boss, a worm gear in said housing and surrounding said supporting device, means connecting said worm gear and said supporting device, a feed shaft positioned at right angles to said supporting device and said first tool carriage shaft, a worm pinion on said feed shaft, said feed shaft being movable axially relative to said worm pinion for rotation therewith, a worm pinion on said first tool carriage shaft, a worm gear on and secured to said feed shaft meshing with said worm pinion on said first tool carriage shaft, said supporting device including a threaded portion, threaded means on said hub for engaging said threaded portion of said supporting device, said threaded means being movable into and out of engagement with said threaded portion of said supporting device.

14. In a tool device, a base, said base having an upstanding boss thereon and having an elongated aperture therein, said boss having an aperture therein, a tool carriage on said base, a shaft rotatably mounted in said tool carriage, a drive shaft, means to support said drive shaft, a gear on said tool carriage shaft, a gear on said drive shaft meshing with said first gear, said second gear being axially movable on said drive shaft, means connecting said second gear and said drive shaft for rotation together, a member positioned in said aperture of said boss, a supporting device, said member being rotatably mounted on said supporting device, means connecting said member and said boss, said supporting device including a threaded portion, a split nut comprising two pivoted portions mounted on said member for engaging said threaded portion of said supporting device, means whereby said base is rotated about the axis of said supporting device when said tool carriage shaft rotates and means whereby when said split nut portions engage said threaded portion of said supporting device said base is moved axially along said supporting device.

LESLIE R. MYERS.
OSCAR MAYER.